UNITED STATES PATENT OFFICE.

RUDOLPH RAMBOUSEK, OF ST. LOUIS, MISSOURI.

TONIC BEVERAGE.

SPECIFICATION forming part of Letters Patent No. 438,020, dated October 7, 1890.

Application filed May 26, 1890. Serial No. 353,240. (No specimens.)

*To all whom it may concern:*

Be it known that I, RUDOLPH RAMBOUSEK, a subject of the Emperor of Austria-Hungary, and a resident of St. Louis, in the State of Missouri, have invented a new and useful Improvement in Tonic Compounds for Beverages, of which the following is a full, clear, and exact description.

This invention has for its object a slightly-effervescent drink to be sold in liquid form, having previously been bottled, that shall have tonic, soothing, and exhilarating qualities, and a very pleasing taste.

My improved compound is preferably formed of the following ingredients and in the proportions now to be named: First, forty parts of honey and sixty parts of water are incorporated and boiled together for a period of about two hours, the impurities which rise to the surface being from time to time removed by skimming; second, to the above compound is added about thirty-two ounces of a pure concrete salt deposited from wines—such as cream-tartar—or, say, sixteen ounces of cream-tartar and sixteen ounces of tartaric acid, sixteen ounces of phosphate of soda, and eight ounces of common salt, and the whole is again boiled for one hour; third, the compound thus formed is to be run into a suitable tub or cask and have added to it about three and one-half pounds of a mixture of raisins and St. John's bread, (carob bean,) preferably three pounds of raisins and eight ounces of St. John's bread, and permitted to stand to ferment, (it may be permitted to stand for from one to two years,) after which it should be cleared by filtering or decanting, and tightly bottled and capped, and is ready for use.

I prefer to make use of the different ingredients as above stated, although the proportions may be varied somewhat to suit the taste. It is preferred to prepare the compound as above specified in separate parts compounded by carrying out separate steps.

What I claim is—

1. An improved beverage compound composed of honey, water, cream of tartar, tartaric acid, phosphate of soda, salt, raisins, and St. John's bread, (carob bean,) prepared substantially as and in the proportions specified.

2. The hereinbefore-described process of manufacturing a beverage, which consists, first, in boiling a mixture of a saccharine liquid, cream of tartar, tartaric acid, and phosphate of soda; second, incorporating with the said liquid raisins and St. John's bread, (carob bean,) and, third, fermenting the said compound, as described.

In testimony whereof I affix my signature in presence of two witnesses.

RUDOLPH RAMBOUSEK.

Witnesses:
C. K. JONES,
JNO. C. HIGDON.